A. NILSON.
BAFFLE WALL.
APPLICATION FILED OCT. 31, 1918.
1,363,005.
Patented Dec. 21, 1920.
2 SHEETS—SHEET 1.
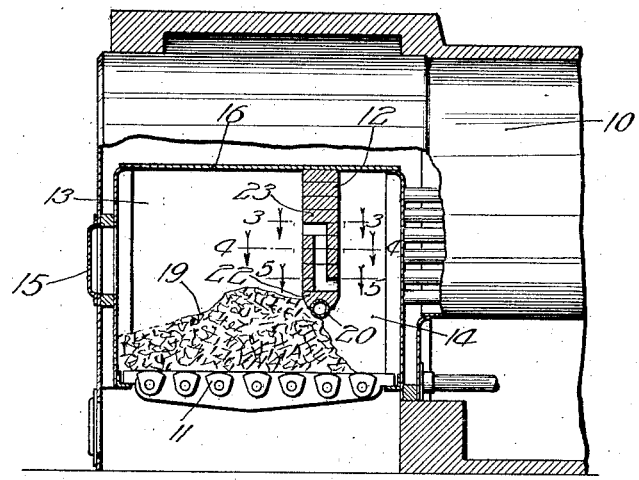
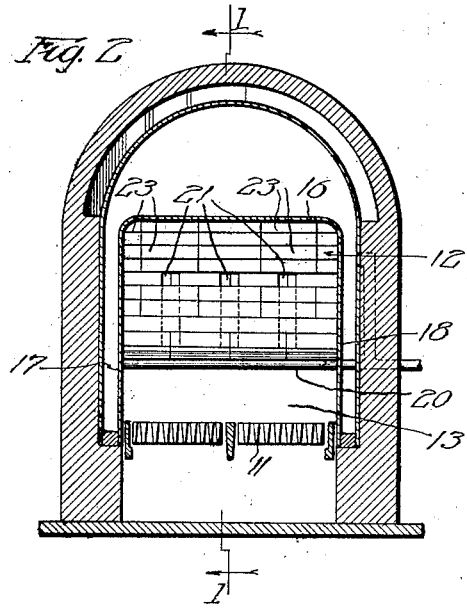
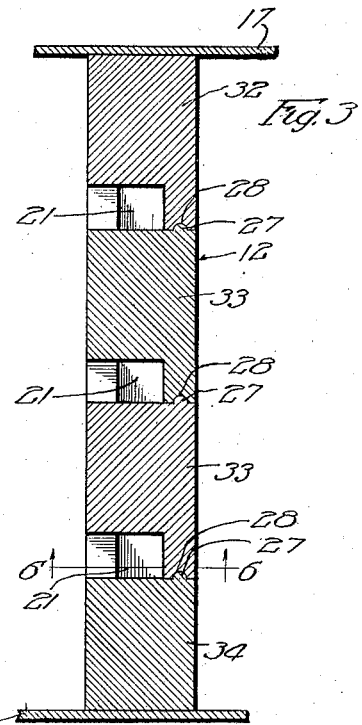
Witnesses
Arthur W. Carlson
Robert H. Weir
Inventor
Andrew Nilson
by Gabel & Mueller
Attys.

A. NILSON.
BAFFLE WALL.
APPLICATION FILED OCT. 31, 1918.
1,363,005.
Patented Dec. 21, 1920.
2 SHEETS—SHEET 2.
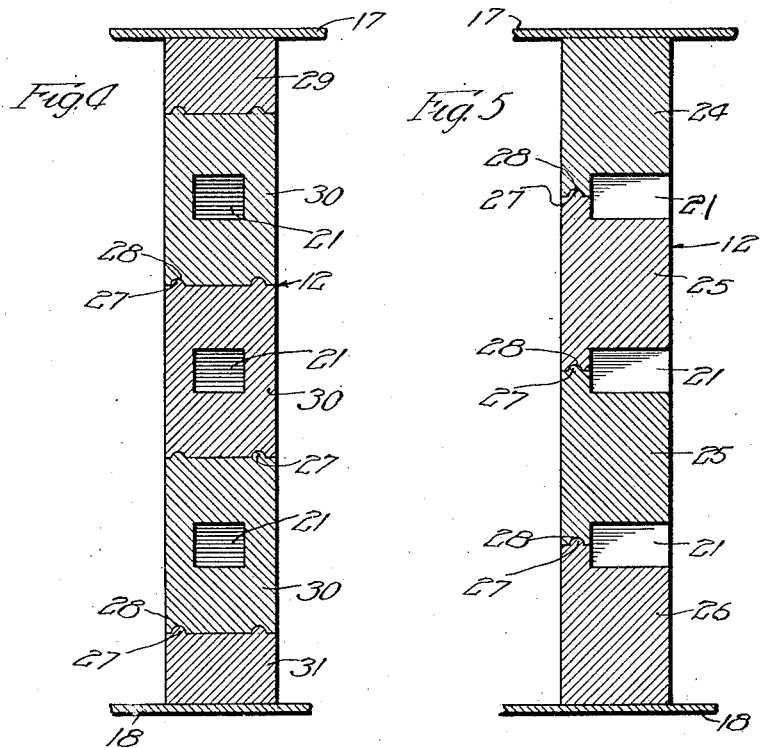
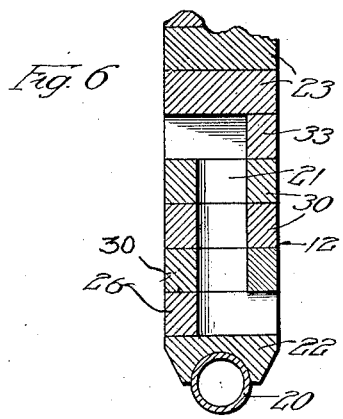
Witnesses:
Arthur W. Carlson
Robert H. Weir
Inventor
Andrew Nilson
by Zabel & Mueller
Attys.

UNITED STATES PATENT OFFICE.

ANDREW NILSON, OF CHICAGO, ILLINOIS, ASSIGNOR TO THE EUREKA SMOKELESS FURNACE COMPANY, OF CHICAGO, ILLINOIS.

BAFFLE-WALL.

1,363,005.  Specification of Letters Patent.  Patented Dec. 21, 1920.

Application filed October 31, 1918. Serial No. 260,470.

*To all whom it may concern:*

Be it known that I, ANDREW NILSON, a citizen of the United States, residing at Chicago, in the county of Cook and State of Illinois, have invented a certain new and useful Improvement in Baffle-Walls, of which the following is a full, clear, concise, and exact description, reference being had to the accompanying drawings, forming a part of this specification.

My invention relates to baffle walls for furnaces and has for its object the provision of an improved baffle wall structure so arranged that the furnace chamber above the grate is divided into two parts, the forward one of which might be called the fuel box and the chamber to the rear of the baffle wall called the combustion chamber. The baffle wall is provided with channels preferably downwardly extending which lead from the fuel chamber to the combustion chamber.

My invention illustrates an improved baffle wall of use in general in connection with furnaces such as disclosed in United States Letters Patents No. 1,235,516, dated July 31, 1917 and No. 1,233,444, dated July 17, 1917.

My invention consists in the provision of a baffle wall structure in which the parts which make up the baffle wall and which are of refractory material are so arranged and proportioned that a greater or lesser number of channels may be provided in accordance with the width of the furnace or other requirements, and that the height of the baffle wall may also be modified to suit conditions.

In the preferred form of the invention, the blocks of refractory material are so formed and proportioned that a built up structure conforming to the requirements heretofore set out can be inserted in any furnace, regardless of the size of the furnace.

I will describe my invention more in detail by referring to the accompanying drawing, in which—

Figure 1 is a longitudinal sectional view on line 1—1 of Fig. 2, of a furnace having a baffle wall of my improved design;

Fig. 2 is a sectional view on line 2—2 of Fig. 1;

Figs. 3, 4 and 5 respectively are sectional views of the baffle wall structure along lines 3—3, 4—4 and 5—5 respectively of Fig. 1, and Fig. 6 is a sectional view along line 6—6 of Fig. 3.

My improved furnace includes the boiler 10 mounted rearwardly of the grate 11, as is customary. The space above the grate is divided into two parts by my improved baffle wall 12, thus forming two chambers, respectively, the fuel chamber 13 and combustion chamber 14. A suitable firing door 15 is provided. The wall 16 forms the roof of the furnace above both the fuel and the combustion chambers. The baffle wall extends the entire width between the side walls 17 and 18 of the furnace. The baffle wall also extends entirely to the roof of the furnace and extends downwardly so that it is normally in contact with and preferably below the top surface of the fuel 19.

The baffle wall is built up of suitable sections or blocks of refractory material, as will presently appear, and these are mounted so that the entire baffle wall is supported upon the water pipe 20, which is suitably fastened to the side walls 17, 18 of the furnace, so that water may pass through it. The water in this pipe keeps the metal of the pipe at a temperature which will not injure the material of which the pipe is made.

The baffle wall is provided with a plurality of channels 21 which lead downwardly from the fuel chamber 13 to the combustion chamber 14. These channels 21 are formed in the baffle wall by the proper selection of blocks when the baffle wall is being built up upon the pipe 20. The construction of these sections is more clearly apparent from Figs. 3, 4, 5 and 6.

The base blocks 22 are suitably formed so that they rest upon the pipe 20. The top section of the baffle wall is preferably constructed and built up of solid blocks 23, there being as many of these solid block sections as may be necessary to completely fill the space to the roof of the furnace. At that portion of the structure where the ducts 21 are to open into the combustion chamber, I provide blocks 24, 25 and 26, blocks 24 and 26 being end blocks which are approximately L-shaped, and blocks 25 fitting between these blocks being preferably T-shaped. It will be readily apparent that the number of ducts depends upon the choice of blocks 25. The blocks are all preferably provided with interlocking tongues 27 and grooves 28 so as to hold them properly in place.

Surmounting the blocks 24, 25 and 26, I provide blocks 29, 30 and 31. Blocks 29 and 31 are placed at the extreme sides, and blocks 30 are provided with holes therethrough which form the vertical portions of the ducts 21. There may be as many sets of blocks 29, 30 and 31 placed one on top of the other as are necessary to provide the predetermined desired height of the ducts 21.

Surmounting the last set of blocks 29, 30 and 31 are placed the blocks 32, 33 and 34, which extend the ducts forwardly so that they open into the fuel chamber. These blocks 32, 33 and 34 are then surmounted by the requisite number of blocks 23 to complete the baffle wall.

The structure described presents a very substantial and solid wall capable of withstanding the hard usage to which it is subjected in the course of normal operation. The wall is held at its central portion by the water pipe 20, and is therefore stable. The block sections where they are in line with the thrusts of the flue cleaner and pokers are of sufficient thickness to withstand the strains caused by these instruments. Likewise, the base blocks are of sufficient rigidity so that the fuel as it is being thrown against the wall does not cause undue wear and tear.

From the above description the nature of my invention will be readily clear to those skilled in the art, and what I claim as my invention is:

1. In a furnace a baffle wall structure comprising a water pipe and a baffle wall carried thereby and mounted thereon, said baffle wall being built up of a plurality of superposed block sections, certain of said block sections having forwardly extending ducts, certain of said block sections having vertical ducts, and certain of said block sections having rearwardly extending ducts, the inner portions of said forwardly and rearwardly extending ducts being connected by means of said vertical ducts.

2. In a furnace a baffle wall structure comprising a water pipe and a baffle wall carried thereby and mounted thereon, said baffle wall being built up of a plurality of superposed block sections, certain of said block sections having forwardly extending ducts, certain of said block sections having rearwardly extending ducts, and certain of said sections having centrally located vertical holes therethrough, said last named block sections being interposed between the two first-named block sections, said holes serving to connect the inner portions of said forwardly extending ducts with the inner portions of said rearwardly extending ducts, to form therewith downwardly extending channels leading from the space forward of said baffle wall to the space rearward thereof.

3. In a furnace a baffle wall structure comprising a water pipe and a baffle wall carried thereby and mounted thereon, said baffle wall being built up of a plurality of superposed block sections, certain of said block sections having cut away portions to form forwardly extending ducts, certain of said block sections having vertical openings therethrough, and certain of said block sections having cut away portions to form rearwardly extending ducts, the inner portions of said ducts being connected by said vertical openings, and said baffle wall having base block sections upon which the aforesaid block sections are mounted, and which base block sections have means whereby they are held in place upon said water pipe.

4. In a furnace a baffle wall structure comprising block sections having forwardly extending ducts, block sections having rearwardly extending ducts, and block sections having centrally located holes therethrough, said last named block sections being interposed between the two first named block sections, said holes serving to connect the inner portions of said forwardly extending ducts with the inner portions of said rearwardly extending ducts, to form therewith downwardly extending channels leading from the space forward of said baffle wall to the space rearward thereof, a water pipe to support the baffle wall and said baffle wall having base block sections upon which the aforesaid block sections are mounted, said base block sections having means whereby they are held in place upon said water pipe.

5. In a furnace a baffle wall structure comprising block sections having cut away portions to form forwardly extending ducts, block sections having cut away portions to form rearwardly extending ducts, and block sections having centrally located holes therethrough, said last named block sections being interposed between the two first named block sections, said holes serving to connect the inner portions of said forwardly extending ducts with the inner portions of said rearwardly extending ducts to form therewith downwardly extending channels leading from the space forward of said baffle wall to the space rearward thereof, and means whereby the horizontally adjoining blocks of the sections are locked together.

6. In a furnace a baffle wall structure comprising block sections having cut away portions to form forwardly extending ducts, block sections having cut away portions to form rearwardly extending ducts, and block sections having centrally located holes therethrough, said last named block sections being interposed between the two first named block sections, said holes serving to connect the inner portions of said forwardly extending ducts with the inner portions of said rearwardly extending ducts to form therewith downwardly extending channels leading from the space forward of said baffle wall to the space rearward thereof, the walls of said channels being composed entirely of ceramic material and means whereby the horizontally adjoining blocks of the sections are locked together.

7. In a furnace a baffle wall structure comprising a water pipe and a baffle wall carried thereby and mounted thereon, said baffle wall being built up of a plurality of superposed block sections, certain of said block sections having cut away portions to form forwardly extending ducts, certain of said block sections having vertical openings therethrough, and certain of said block sections having cut away portions to form rearwardly extending ducts, the inner portions of said ducts being connected by said vertical openings, and said baffle wall having base block sections upon which the aforesaid block sections are mounted, said base block sections being provided with substantially semi-circular recesses to receive said water pipe and form an interlocking joint therewith, whereby said baffle wall is held in place upon said water pipe.

8. In a furnace a baffle wall structure comprising block sections having forwardly extending ducts, block sections having rearwardly extending ducts, and block sections having centrally located holes therethrough, said last named block sections being interposed between the two first named block sections, said holes serving to connect the inner portions of said forwardly extending ducts with the inner portions of said rearwardly extending ducts, to form therewith downwardly extending channels leading from the space forward of said baffle wall to the space rearward thereof, a water pipe to support the baffle wall and said baffle wall having base block sections upon which the aforesaid block sections are mounted, said base block sections being provided with substantially semi-circular recesses to receive said water pipe and form an interlocking joint therewith, whereby said baffle wall is held in place upon said water pipe.

In witness whereof I hereunto subscribe my name this 17th day of October, A. D. 1918.

ANDREW NILSON.